United States Patent
Mansfield et al.

(12) 
(10) Patent No.: US 6,243,365 B1
(45) Date of Patent: *Jun. 5, 2001

(54) CONTINUATION CONTROL FOR WIRELESS PACKET DATA

(75) Inventors: Carl Mansfield, Portland, OR (US); Izzet M. Bilgic, Colorado Springs, CO (US); Benjamin K. Gibbs, Colorado Springs, CO (US); Sherman L. Gavette, Colorado Springs, CO (US)

(73) Assignee: Opuswave Networks, Inc., Colorado Springs, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,260

(22) Filed: Aug. 4, 1998

(51) Int. Cl.[7] ............................................. H04J 3/24
(52) U.S. Cl. ................................................ 370/310
(58) Field of Search ............................. 370/229, 230, 370/235, 236, 389, 410, 346, 449, 450, 459, 465, 468, 471, 473, 466, 401, 442, 464, 461, 310

(56) References Cited

U.S. PATENT DOCUMENTS

| 5,191,583 | * | 3/1993 | Pearson et al. | 370/473 |
| 5,483,532 | * | 1/1996 | Eriksson | 370/473 |
| 5,535,426 |   | 7/1996 | Leigh et al. | 455/34.1 |
| 5,802,465 | * | 9/1998 | Hamalainen et al. | 455/403 |

* cited by examiner

*Primary Examiner*—Dang Ton

(57) ABSTRACT

A method for transmission continuation control includes establishing a physical transmission link between a first entity and a second entity, and transmitting a first user message from one of the first and second entities to the other of the first and second entities. The method also includes executing a continuation protocol between the first entity and the second entity while maintaining the physical transmission link. The method further includes transmitting a second user message from one of the first and second entities to the other of the first and second entities, and terminating the physical transmission link between the first entity and the second entity after the transmission of the second user message.

19 Claims, 13 Drawing Sheets

CONTINUATION CONTROL FOR WIRELESS PACKET DATA

FIELD OF THE INVENTION

The field of this invention pertains to telecommunications, including a telecommunications system that includes continuation control for the transmission of packet data.

DESCRIPTION OF THE TECHNOLOGY

Generally, in known wireless communication systems that support the transmission of packet data, allocation of physical, i.e., over-the-air, connection resources is performed individually for each packet of data that is sent, in order to provide fair and efficient utilization of the over-the-air resource between multiple users. Subsequent release, or termination or de-allocation, of the physical connection resources is performed after each packet of data has been received, or its transmission is otherwise terminated. In known wireless communication systems that support the transmission of packet data, the logical link for the transmission of packet data may also be allocated, and subsequently terminated, or suspended, for each packet data transmission. When supporting packet data communications, however, the overhead on the system of allocating, and releasing, resources for every transmitted packet data can be significant.

For example, referring to FIG. 1, which depicts a general processing flow 100 in known wireless systems, logical link and physical connection resources are established 101 before the initiation of the transfer of packet data from a transmitting entity to a receiving entity. The protocol for implementing the establishment of the transmission resources, not shown, can be time and resource consuming.

Once both the logical link and the physical connection resources are established for the actual transmission of data between the wireless system and an end entity, one or more frames, or data segment(s), of packet data are transmitted 102.

The transmitting entity, i.e., either the wireless system or the end entity that is transmitting the packet data, checks 103 to see if it has successfully transmitted the last frame of the packet data, and, thus, the entire packet data. If not 104, the transmitting entity continues to transmit 102 frame(s) of packet data to the receiving entity, i.e., either the wireless system or the end entity that is receiving the packet data.

If, however, the transmitting entity has successfully transmitted the last frame of the packet data 105 to the receiving entity, it thereafter releases the physical connection resources 106 that were acquired for transmitting the packet data. The transmitting entity may also at this time be required to release the logical link that it acquired for the transmission of the packet data.

Thereafter, either the receiving entity or the transmitting entity, or both, ascertains 107 whether it has more data to transmit to the other. If no 108, that is the end of the current processing scenario 109 between the transmitting and receiving entities. If, however, either the original receiving entity or the original transmitting entity has more data to transmit to the other 110, then the entire processing flow 100 is repeated, beginning with a new establishment of resources 101.

SUMMARY OF THE INVENTION

The inventions provide methods and mechanisms for transmission continuation control between a first entity, e.g., a telecommunications system, and a second entity, e.g., an end user, or entity, of the telecommunications system.

In a presently preferred embodiment, a physical transmission link, e.g., over-the-air resources, are established for the transmission of a user message, i.e., a message between a system and an end user of the system, for example, e.g., packet data, between a telecommunications system and an end user. After the physical transmission link is established, either the telecommunications system transmits a user message to the end user, or, alternatively, the end user transmits a user message to the telecommunications system.

Upon the completion of the transmission of a first user message between the telecommunications system and the end user, a continuation protocol may be executed between them, for the further transmission of a user message between them. In a presently preferred embodiment, execution of the continuation protocol eliminates the need to terminate, or otherwise de-allocate, or release, the established physical transmission link between the end user and the telecommunications system after the transmission of the first user message. Thus, in a presently preferred embodiment, execution of the continuation protocol further eliminates the need to establish, or re-establish, a physical transmission link between the end user and the telecommunications system prior to the transmission of subsequent user message(s) between them.

After executing the continuation protocol, a second user message is transmitted between the end user and the telecommunications system. The continuation protocol may continue to be executed, with additional user messages transmitted between the end user and the telecommunications system. Sometime after the user message transmissions between the end user and the telecommunications system are transmitted, the physical transmission link between them is terminated.

Thus, a general object of the inventions is to provide continuation control mechanisms and methods that reduces the overhead required to transmit more than one packet data, or other user message, between two entities, e.g., between a telecommunications system and an end user. A further general object of the inventions is to provide continuation control mechanisms and methods for transmissions that allows for increased throughput of user message traffic. Other and further objects, features, aspects and advantages of the inventions will become better understood with the following detailed description of the accompanying drawings.

DESCRIPTION OF THE PREFERRED EMBODIMENTS

In the following description, for purposes of explanation, numerous specific details are set forth in order to provide a thorough understanding of the invention. It will be apparent, however, to one skilled in the art, that the invention may be practiced without these specific details. In other instances, well-known structures, devices or protocols are shown in block diagram form to avoid unnecessarily obscuring the invention.

In a presently preferred embodiment of a system supporting packet data, continuation control is used while resources are allocated, in order that additional user messages, i.e., messages between the system and end users of the system, may be transferred from the transmitting entity to the receiving entity. In this embodiment, alternatively, continuation control is used while resources are allocated, in order that user messages may be transferred from the original receiving entity, now the transmitting entity, to the original transmitting entity, now the receiving entity. In a presently preferred embodiment, the user messages are packet data.

Figure 1:
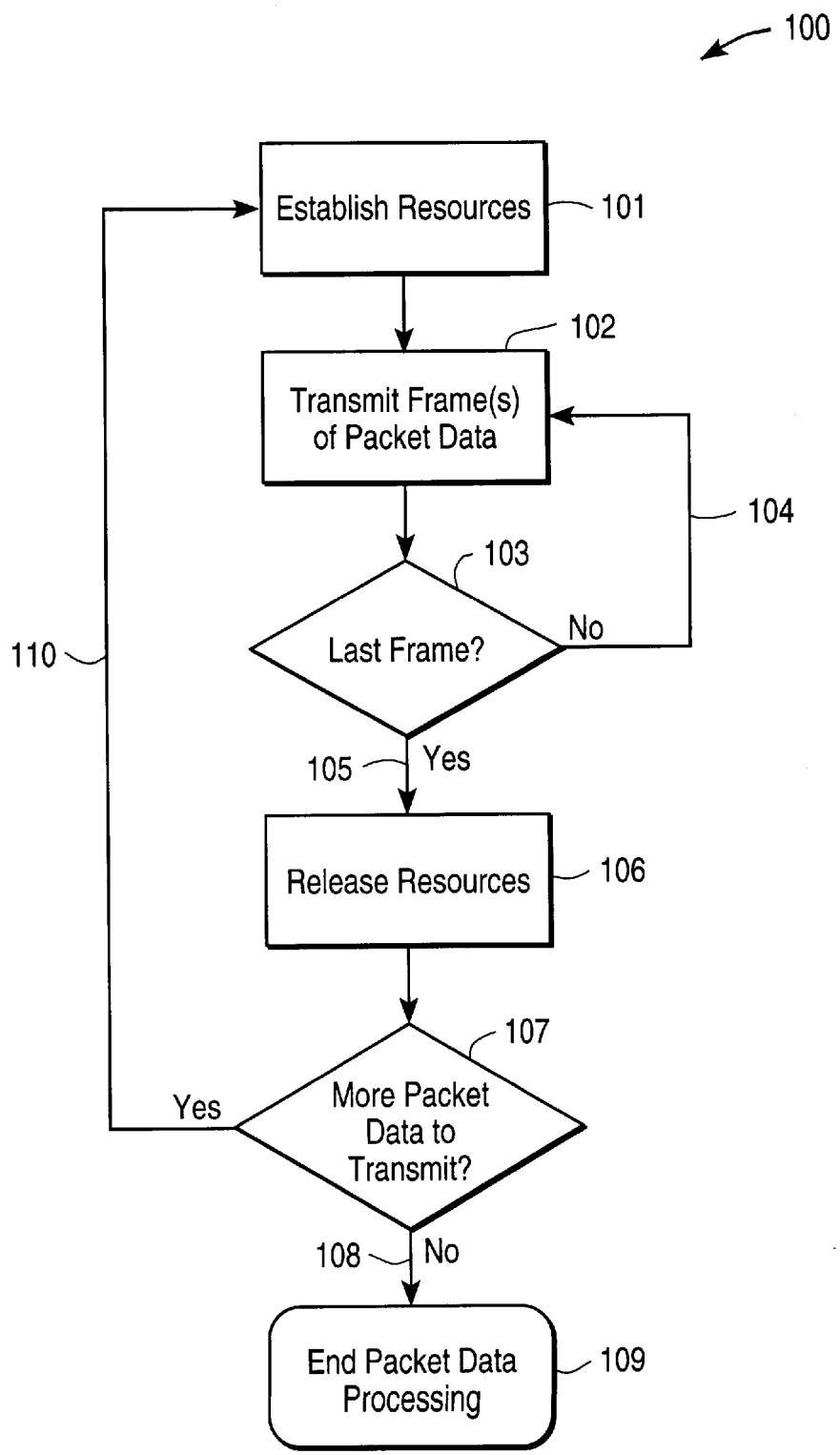
FIG. 1 is a known general process flow for transmitting packet data in a wireless system.
Figure 2:
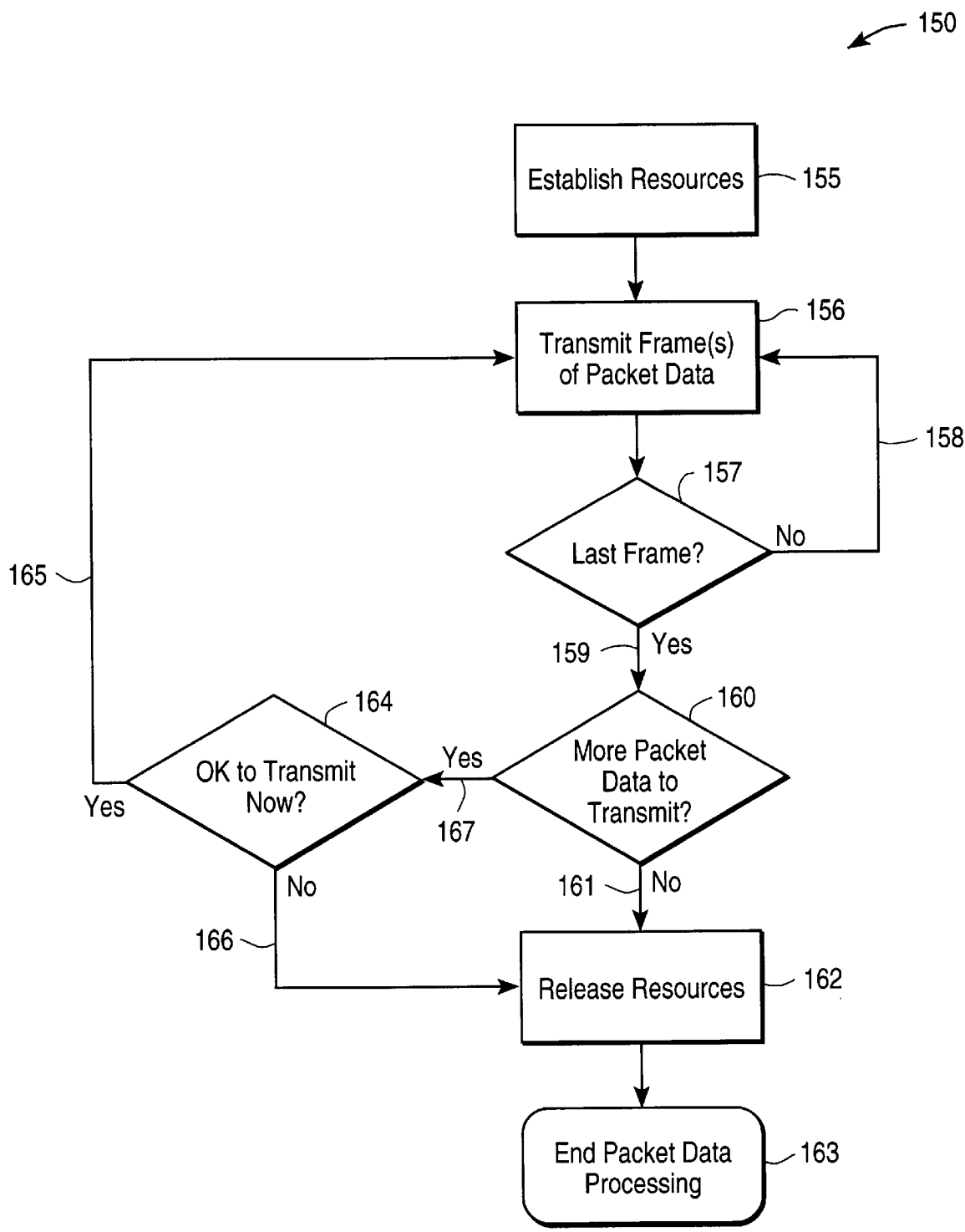
FIG. 2 is a general process flow for transmitting packet data using continuation control in a wireless system.

Referring to FIG. 2, a presently preferred embodiment of a general process flow 150, with continuation control, for packet data transmissions, is used in a wireless network. In a presently preferred embodiment, packet data is transmitted between a mobile station ("MS") of a mobile end station ("MES"), i.e., an end user, and a base transceiver station ("BTS") of a wireless packet data service provider network. In an alternative embodiment, an MES can comprise a fixed terminal.

The general process flow 150 begins with the establishment of resources 155 for the transmission of packet data between a transmitting entity, e.g. an MES or a BTS, and a receiving entity, e.g., the other of the MES or the BTS that is acting as the transmitting entity. In an embodiment, the establishment of resources 155 includes the establishment of logical link resources in the wireless network, for transmittal of packet data from one end user to another end user. The establishment of resources 155 additionally includes the establishment of physical, over-the-air, resources between the MES and the BTS.

Once the resources have been established 155 for the transmission of packet data, one or more frames, or data segments, of the packet data are transmitted 156, and received. The entity transmitting the frame(s) of packet data on the over-the-air interface checks 157 whether the last frame of the current packet data to be sent has been successfully transmitted. If the last frame has not been successfully transmitted 158, the transmitting entity continues to transmit 156 frame(s) of the current packet data.

If, however, the last frame of the current packet data to be sent has been successfully transmitted 159, either, or both, the original transmitting entity and/or the original receiving entity determine 160 whether it has more packet data to be transmitted to the other, and if so, if such data is ready for immediate transmission.

If neither the original transmitting entity nor the original receiving entity has more packet data to transmit to the other 161, the over-the-air resources for transmitting packet data between them are released 162, i.e, the physical transmission link between them is terminated, or otherwise de-allocated, or released. The process flow for transmitting packet data between them is then terminated 163.

If, however, either the original transmitting entity or the original receiving entity has more packet data to transmit to the other 167, and the data is ready for immediate transmission, then the wireless network, or system, determines 164 whether or not to allow the transmission of packet data between the two entities to continue at the time. In a presently preferred embodiment, the determination of whether or not to allow the continuation of the transmission of packet data between a BTS and an MES at a time is based on the results of one or more resource allocation algorithms processed in the BTS.

If the system allows 165 more packet data to be transmitted between the original transmitting and receiving entities at the time, then one or more frames of packet data are thereafter transmitted 156 between them. On the other hand, if the system does not allow 166 more packet data to be transmitted between the original transmitting and receiving entities at the time, the over-the-air resources for packet data transmission between them are released 162, and the process flow ends 163.

Figure 3:
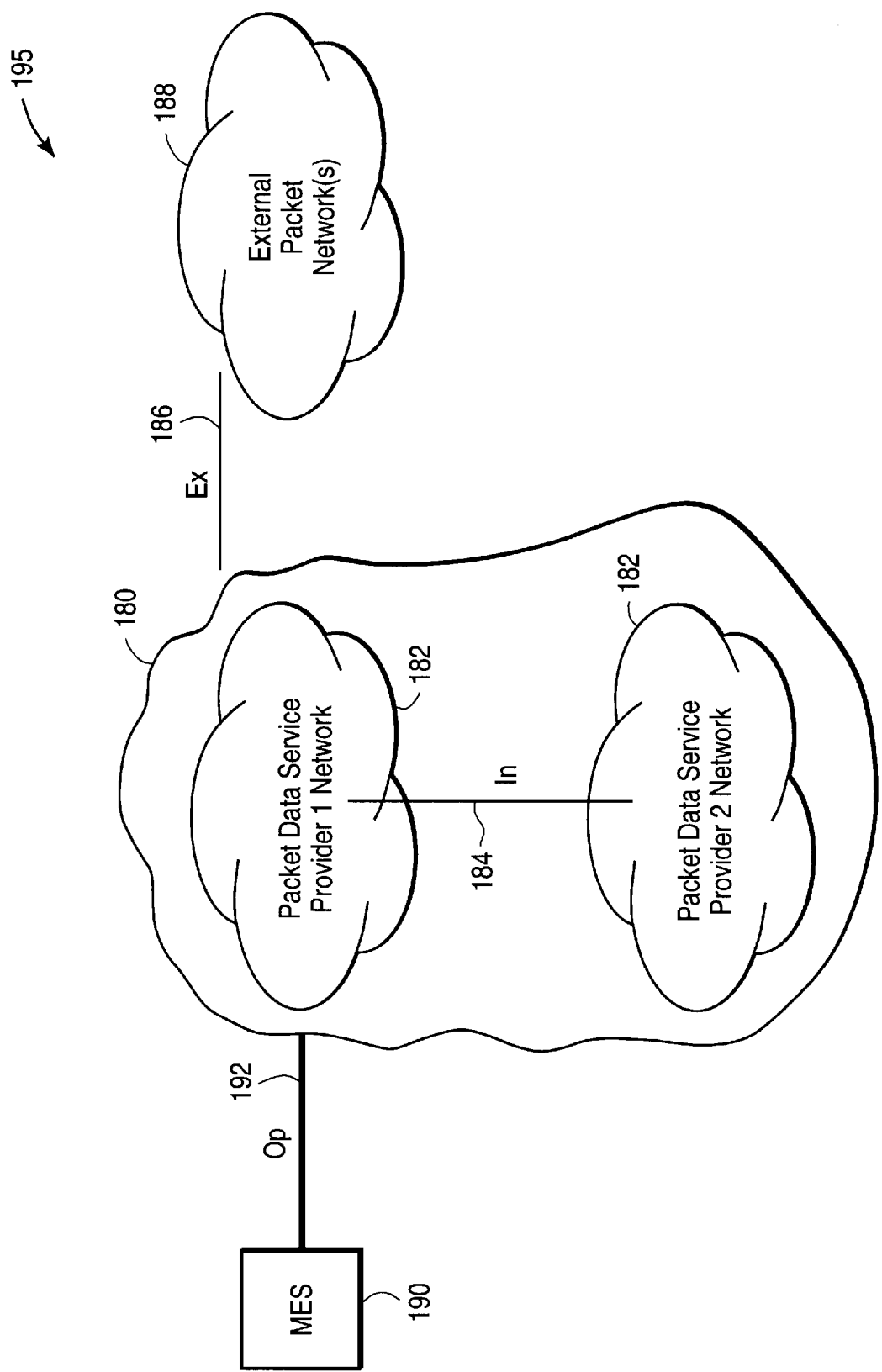
FIG. 3 is a general embodiment of a packet data services network.

In a presently preferred embodiment of a wireless network, or system, 195 supporting packet data, as shown in FIG. 3, a packet data services network 180 is a collection of packet data service provider networks 182. The packet data service provider networks 182 are connected to each other via an internal network interface 184.

In a presently preferred embodiment, each packet data service provider network 182 has a base station subsystem ("BSS") and a network switching subsystem ("NSS"). In general, a BSS provides wireless transmission capabilities and access. In a presently preferred embodiment, a BSS has one or more base transceiver stations ("BTS"s) and a base station controller ("BSC"). In an alternative embodiment, a BSS may have more than one BSC. A BTS is responsible for managing the over-the-air resources between an end user of the wireless network 195 and a packet data service provider network 182. Thus, the BTS is responsible for the physical communication link for end users to gain access to the wireless network 195.

In general, an NSS of a packet data service provider network 182 is a collection of network elements that provides switching and interconnectivity support for the wireless network 195.

In a presently preferred embodiment, the packet data services network 180 is connected, via an external network interface 186, to one or more external packet data networks 188. The external packet data networks 188 are networks that are external to the packet data services network 180. An example of an external packet data network 188 is the Internet. In a presently preferred embodiment, the external network interface 186 is a landline interface, and thus, provides a wireline interface between the packet data services network 180 and an external packet data network 188.

One or more mobile end stations 190 communicate with the packet data services network 180. A mobile end station ("MES") 190 is generally an end user of the wireless network 195. In a presently preferred embodiment, an MES is a terminal unit. An MES 190 can negotiate for and acquire a physical communication connection with a packet data service provider network 182 via an over-the-air ("OP"), i.e., wireless, interface 192. Generally, the OP interface is the physical transmission interface, or link, between the MES 190 and a wireless packet data service provider network 182.

In a presently preferred embodiment, an MES 190 comprises a mobile station ("MS"), a data terminal adapter ("DTA") and data terminal equipment ("DTE"). The MS provides the communication interface, over-the-air, between the MES 190 and a packet data service provider network 182.

Figure 4A:
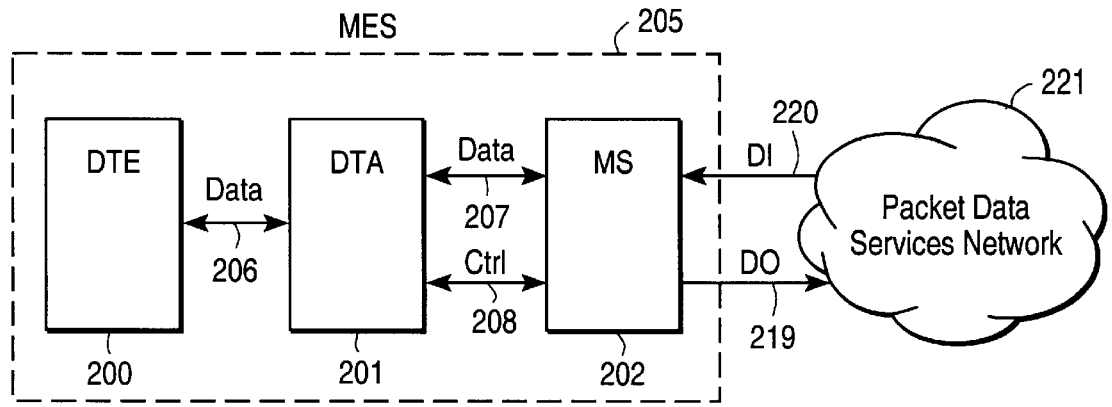
FIGS. 4A, 4B and 4C illustrate various different embodiments of a mobile end station ("MES")

In one embodiment, referring to FIG. 4A, the DTE 200, the DTA 201 and the MS 202 are physically separate units in the MES 205. In one example of this embodiment, the DTA 201 resides inside the DTE 200, in the form of a data terminal equipment ("DTE") card. In a presently preferred embodiment, the DTE 200 is a personal computer ("PC") and the DTE card is a PC card. In this example, the DTA 201 connects to the MS 202 by a cable. In another example of this embodiment, the DTA 201 is a separate unit on a cable that connects the MS 202 to a DTE RS-232 port.

In the MES 205, data 206 is passed between the DTE 200 and the DTA 201, and data 207 and control information 208 is passed between the DTA 201 and the MS 202.

Figure 4B:
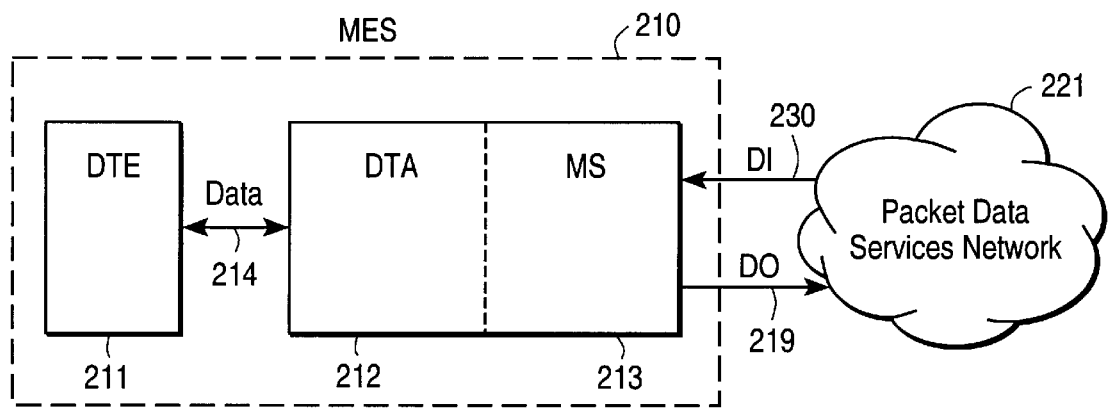

In another embodiment of an MES 210, referring to FIG. 4B, the MS 213 and the DTA 212 are incorporated into a single physical unit, while the DTE 211 remains a separate unit. In this embodiment, the combined MS 213 and DTA 212 connect to, and, thereby transfer data 214 to and from the DTE 211 via a serial port on the DTE 211. In a presently preferred embodiment, the DTE 211 is a PC.

Figure 4C:
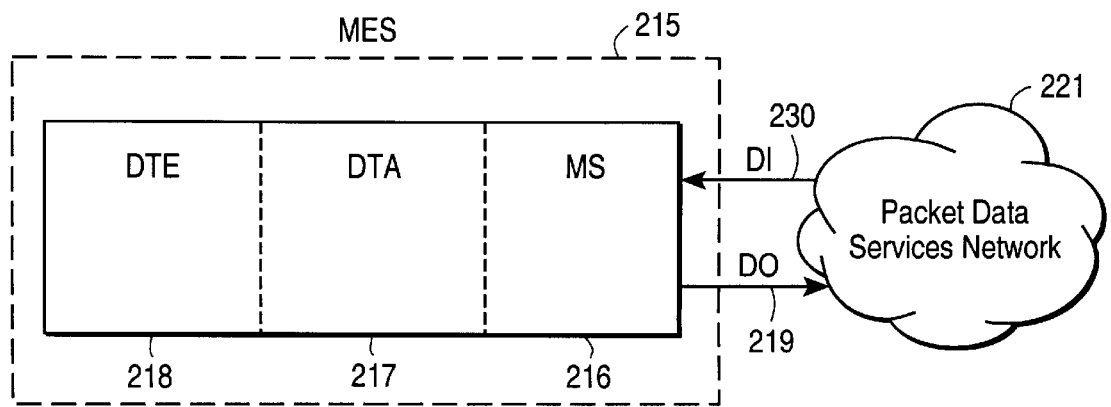

In yet another embodiment of an MES 215, referring to FIG. 4C, the MS 216, the DTA 217 and the DTE 218 are all incorporated into a single physical unit.

In each of the embodiments of an MES (205, 210 and 215 of FIGS. 4A, 4B and 4C respectively), data is transmitted out 219 of the MS to a packet data services network 221 and is received into 220 the MS from the packet data services network 221.

Referring again to FIG. 3, a packet data services network 180 provides a standard Internet Protocol ("IP") network layer service, and, therefore, generally all of the applications over the Internet are available via the packet data services network 180. Further a packet data services network 180 enables an MES 190 to transmit and receive data to and from other entities, for example, e.g., external packet data networks 188 and/or other MESs 190, connected to the packet data services network 180. An MES 190 is an endpoint of communication in the wireless network 195, and, therefore, each MES 190 is a potential source and destination of network traffic, i.e., user messages.

In a presently preferred embodiment, whenever packet data traffic loading on a packet data service provider network 182 is relatively low, it is advantageous to allow an MES that has already established a physical, i.e., radio link or over-the-air, connection on the packet data service provider network 182 to maintain the connection if there is additional pending packet data ready to be transmitted to or from it. In a presently preferred embodiment, the allowance, or denial, of a transmission continuation, i.e., the transmission of additional packet data without first releasing, and then reestablishing a physical communication link on the packet data service provider network 182, is under the control of the packet data service provider network 182.

In times of traffic loading congestion, transmission continuation is generally denied, in order that packet data service provider network resources are not continuously used by the same MESs. In a presently preferred embodiment, even under medium traffic loading conditions on a packet data service provider network 182, transmission continuation is generally denied, again in order that the packet data service provider network resources are not continuously used by the same MESs.

In an alternative embodiment, a packet data service provider network 182 may allow transmission continuation under medium or high traffic loading conditions, as a method for preventing the stalling of upper layer protocol processing and applications failures.

Figure 5:
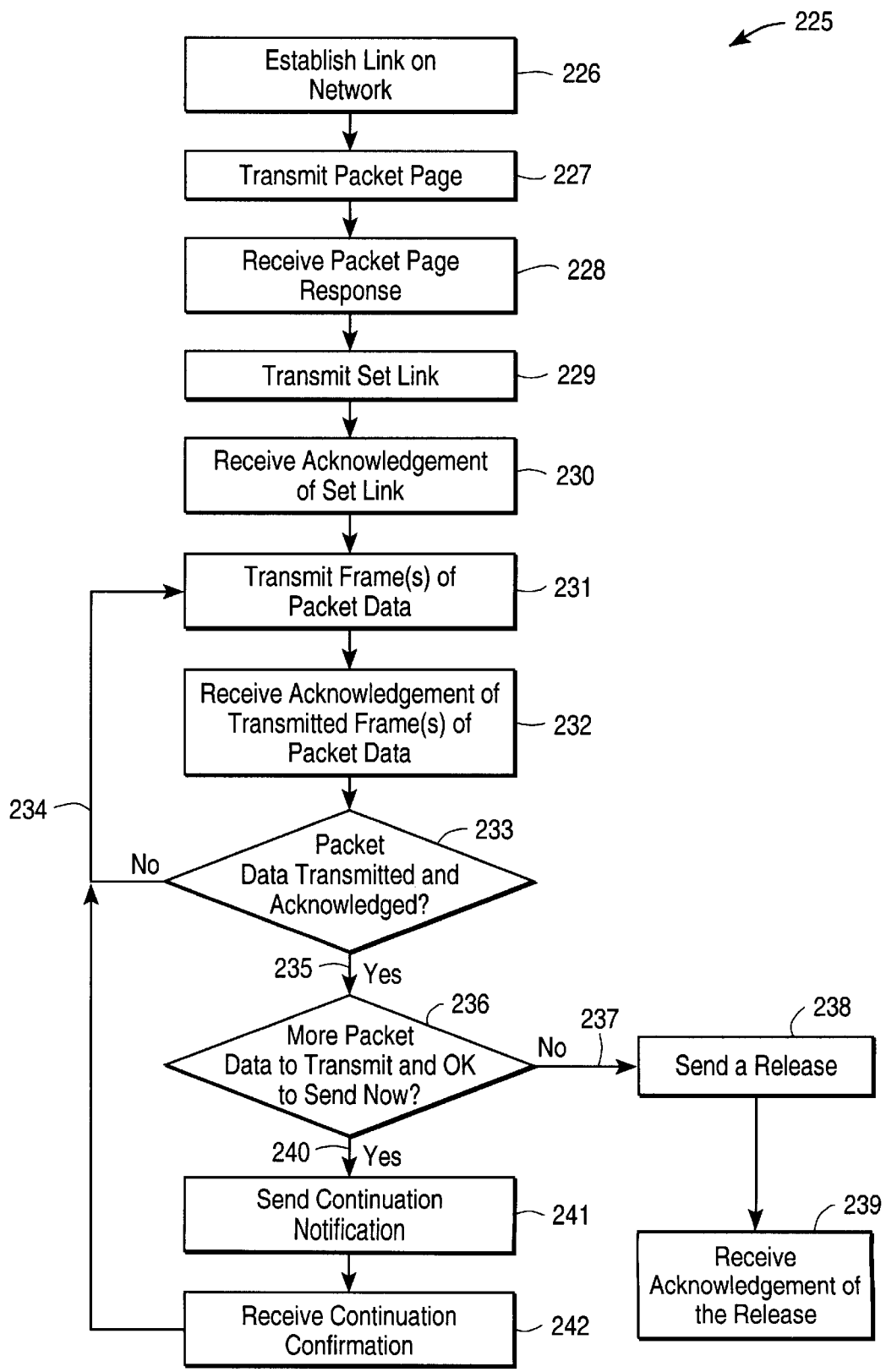
FIG. 5 is a process flow for transmitting more than one contiguous packet data from a base transceiver station ("BTS") to an MES, using a continuation mechanism.

Referring to FIG. 5, a more specific process flow 225 for a presently preferred embodiment of a continuation control where the BTS initiates the continuation transmission depicts contiguous packet data transmitted from a BTS to an MES. A logical link is first established 226 on a network, e.g. on a packet data services network, for the transfer of a user message, e.g., packet data, from one end entity, or user, to another, e.g., one MES to another, or one external network source to an MES. As in process flow 225 packet data is transmitted from a BTS to an MES, the BTS transmits 227 a page to the MES, initiating the protocol for establishing a physical transmission link between the BTS and the MES. Generally, the page is a control message that indicates to the MES that the BTS has packet data to transmit to it. In a presently preferred embodiment, the page is a Packet Page message.

The BTS then waits to receive 228 a response from the MES, indicating the MES received the Packet Page message. Generally, the response to the Packet Page message is a control message indicating that the MES received the Packet Page message. In a presently preferred embodiment, the response to the Packet Page message is a Receive Packet Page Response message. In an alternative embodiment, the response to the Packet Page message is a generic control acknowledgement message, indicating acknowledgement of the previous message received by the entity transmitting the acknowledgement message.

Once the BTS receives 228 the response to its page from the MES, it transmits 229 a link message to the MES. In a presently preferred embodiment, the link message is a control message that includes an over-the-air map for both the downlink channel, for transmitting frame(s) of the packet data, and the uplink channel, for transmitting acknowledgement(s) of the frame(s). Thus, in a presently preferred embodiment, the link message includes the time slots and/or frequency channels, i.e., the bandwidth, for transmitting the packet data and the bandwidth for transmitting one or more acknowledgments of the packet data. In a presently preferred embodiment, the link message is a Set Link message.

Upon transmitting 229 the link message, the BTS waits to receive 230 an acknowledgement of the link message from the MES. In a presently preferred embodiment, the response to the link message is a generic control acknowledgement message.

Subsequent to receiving 230 the response to the link message, the BTS transmits 231 one or more frames of packet data per time frame to the MES, and waits to receive 232 one or more acknowledgements of the frames of packet data per time frame from the MES. Generally, the acknowledgements of the frame(s) of packet data indicate that the data was successfully transmitted. A presently preferred embodiment for acknowledging frames of packet data is described in co-pending application Lyon & Lyon No. 09/128,739 entitled "Efficient Error Control For Wireless Packet Transmissions," filed Aug. 4, 1998, which is hereby incorporated herein by reference as if fully set forth herein.

The BTS checks 233 to see if it has transmitted the final frame of the current packet data, and received an acknowledgment indicative that all frames of the packet data have been successfully transmitted. If the BTS has not successfully transmitted 234 all frames of the current packet data, it again transmits 231 one or more frames of packet data per time frame to the MES, and waits to receive 232 the MES's responsive acknowledgement(s).

If, however, the BTS has successfully transmitted 235 all of the frames of the current packet data to the MES, and has received acknowledgement thereof, it then determines 236 whether it has additional packet data to transmit to the same MES, and, if so, whether to continue to transmit packet data to that MES at the time. In a presently preferred embodiment, the BTS will continue to transmit packet data to the same MES only if the BTS has frames of the additional packet data buffered and ready for transmission. In a presently preferred embodiment, the determination of whether or not to continue to transmit packet data to the same MES is based on the results of one or more resource allocation algorithms processed in the BTS.

If the BTS does not have more packet data to send to the same MES and/or it has determined not to continue to transmit packet data to that MES at the time 237, it transmits 238 a release to the MES. The release is a control message that generally informs the MES to relinquish the over-the-air, i.e., the physical transmission, link between the MES and the BTS. In a presently preferred embodiment, the release is a Release message.

After transmitting 238 a release to the MES, the BTS then waits to receive 239 an acknowledgment of the release from the MES. In an embodiment, the acknowledgement of the release from the MES to the BTS is a generic control acknowledgement message.

If, however, the BTS does have more packet data ready to be sent to the same MES and it has determined to continue to transmit packet data to that MES at the time 240, the BTS transmits 241 a continuation notification to the MES. In a presently preferred embodiment, the continuation notification is a control message that indicates more packet data is to be transmitted to the MES. Further, in a presently preferred embodiment, the continuation notification contains an over-the-air map for both the downlink channel, for transmitting frame(s) of packet data, and the uplink channel, for transmitting acknowledgement(s) of the frame(s) of packet data, for the transmission of the additional packet data. In this manner, different over-the-air resources, e.g., different time slots, and/or different amounts of over-the-air resources may be allocated for the new packet data transmission, between the same BTS and MES. Alternatively, the over-the-air map in the continuation notification may contain the same downlink channel, e.g., one or more time slots used for the transmission of frames of data, and the same uplink channel, e.g., time slot used for the transmission of acknowledgement(s) of the frames of data, as were used for transmission of the first packet data.

After transmitting 241 the continuation notification, the BTS waits to receive 242 a continuation confirmation from the MES. In a presently preferred embodiment, the continuation confirmation is a control message indicating the MES's receipt of the prior continuation notification. In an alternative embodiment, the continuation confirmation is a generic control acknowledgement message.

Subsequent to receipt 242 of the continuation confirmation, the process flow 225 continues as previously described, with the BTS transmitting 231 one or more frames of packet data to the MES per time frame, and waiting to receive 232 appropriate acknowledgement(s) of the transmission of the frames of packet data from the MES.

Figure 6:
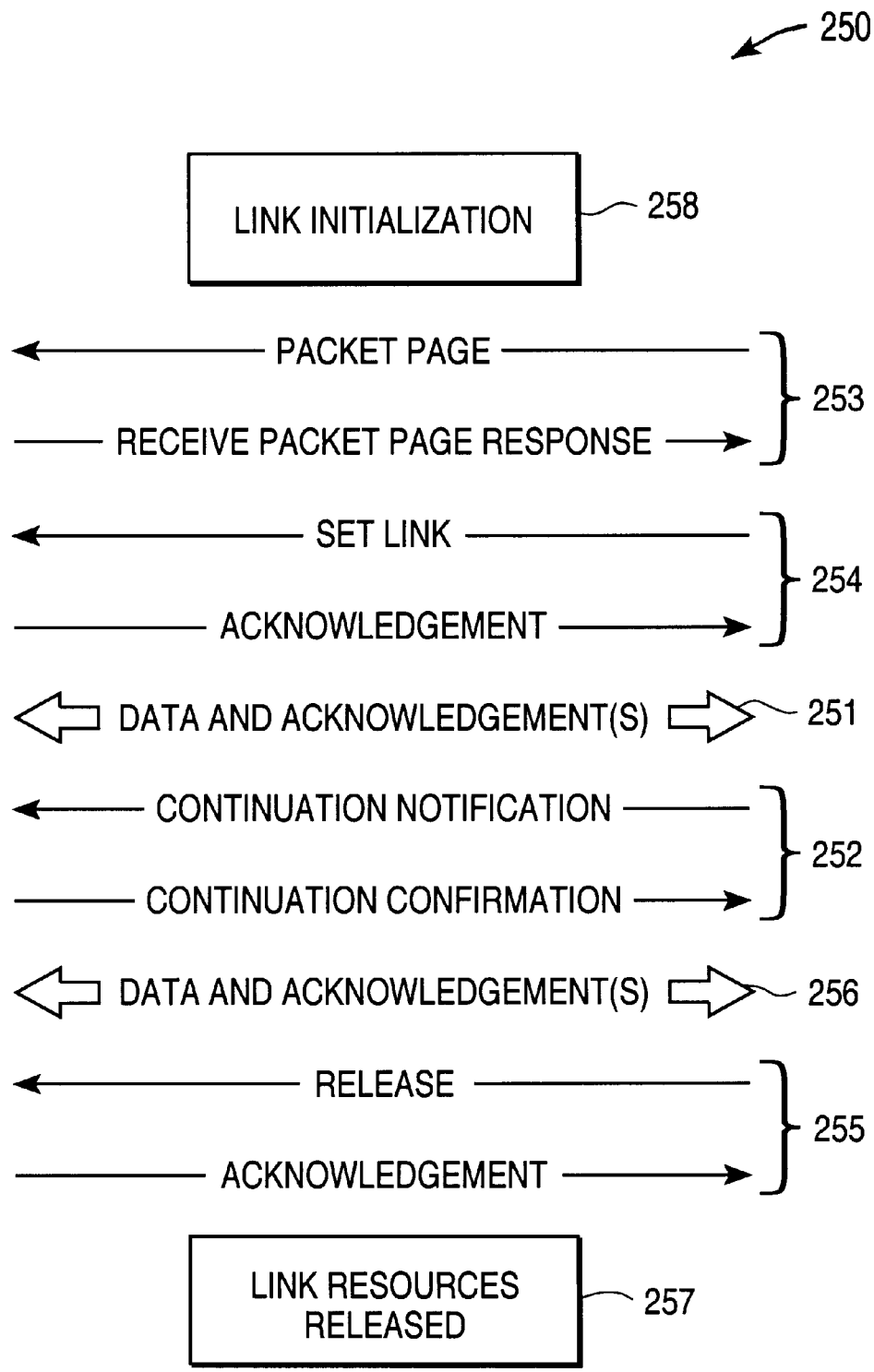
FIG. 6 is a traffic scenario for the transmission of more than one contiguous packet data from a BTS to an MES, using a continuation mechanism.

Referring to FIG. 6, a presently preferred embodiment of a general exemplary message flow 250 for the contiguous transmission of two packets of data from a BTS to an MES shows that with the use of a continuation mechanism, the overhead normally necessary in allocating resources for packet data transmission is reduced. In comparison, referring to FIG. 7, a general exemplary message flow 270 for the transmission of two packets of data from a BTS to an MES with no use of a continuation mechanism highlights the resultant additional required control overhead.

Although FIG. 6 depicts an exemplary message flow 250 for the contiguous transmission of two packets of data from a BTS to an MES, the continuation mechanism allows for additional, i.e., more than two, contiguous transmissions of packets of data from a BTS to an MES.

Figure 7:
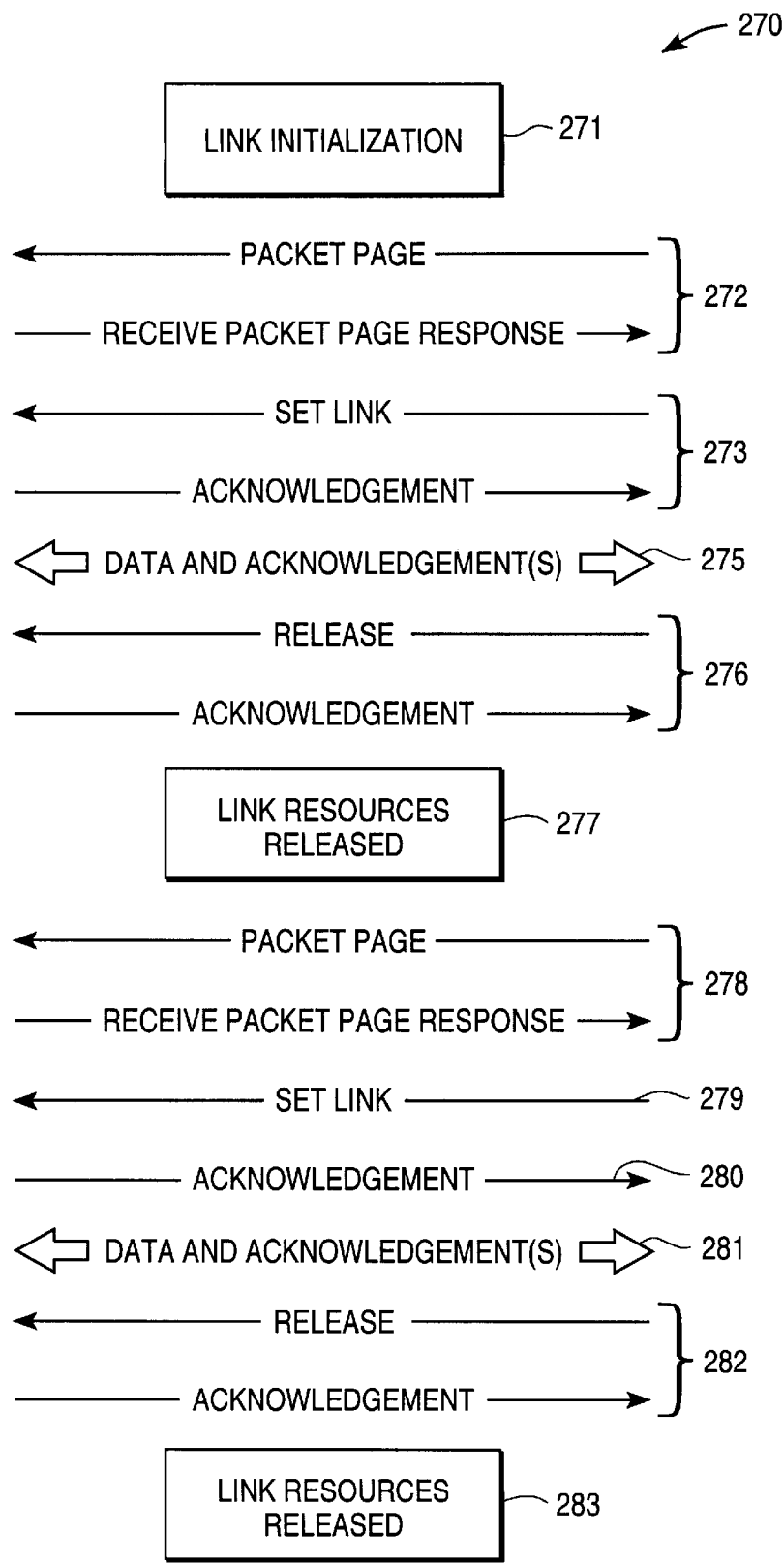
FIG. 7 is a traffic scenario for the transmission of more than one packet data from a BTS to an MES, without the use of a continuation mechanism.

In both the message flow 250 of FIG. 6 and the message flow 270 of FIG. 7 a logical link is established (258 in message flow 250 and 271 in message flow 270 respectively) for the transmission of packet data from one end entity, e.g., an MES or an external packet data network, through the packet data services network, to a second end entity, e.g., an MES.

Before a first packet data can be transmitted, the BTS and MES execute a protocol (253 in message flow 250 and 272 in message flow 270 respectively) to acquire an over-the-air link between them. As previously described, a presently preferred embodiment protocol for an MES to acquire over-the-air resources on a BTS, for the BTS's subsequent packet data transmission to the MS, includes the BTS transmitting a Packet Page message to the MES and the MES responding with a Receive Packet Page Response message transmitted to the BTS.

Thereafter, the BTS and MES execute a protocol (254 in message flow 250 and 273 in message flow 270 respectively) for establishing over-the-air resources for a user message, e.g. packet data, transmission between them. As previously described, a presently preferred embodiment protocol for the BTS to establish over-the-air resources for an MES, for the BTS's subsequent packet data transmission to the MES, includes the BTS transmitting a Set Link message to the MES and the MES responding with an acknowledgement message transmitted to the BTS.

After establishing over-the-air resources for a packet data transmission, the BTS can transmit frame(s) of a first packet data (251 in message flow 250 and 275 in message flow 270 respectively) to the MES, receiving appropriate acknowledgement(s) to the frame(s) transmitted.

In exemplary message flow 270, where no continuation mechanism is used, after the first packet data is successfully transmitted 275, a protocol for releasing the previously established over-the-air link between the MES and the BTS is executed 276. As previously described, in a presently preferred embodiment, the protocol wherein the BTS initiates the release of the over-the-air link between itself and an MES includes the BTS transmitting a Release message to the MES and the MES responding with an acknowledgment message transmitted to the BTS.

Thus, without a continuation mechanism, physical link resources are released 277 in between packet data transmissions. In some networks, the logical link established for the transmission of the first packet data may also be required to be terminated, or suspended, after the first packet data is transmitted, or its transmission is otherwise terminated.

If the network, or system, requires the termination of the logical link between packet data transmissions with no continuation mechanism, as in the message flow 270, the logical link must be reestablished, or a new logical link established, prior to the transmission of a second packet data between the same BTS and the same MES.

Additionally, the protocol to establish a new over-the-air link must be executed 278, and over-the-air resources allocated 279 and acknowledged 280, before the BTS can transmit 281 a second packet data to the MES. Re-establishing a logical and/or physical communication link between the BTS and the MES itself involves the use of the BTS's over-the-air resources, as well as taking time. Additionally, forcing the MES to relinquish its communication link with the BTS can allow, in the meantime, another MES with less priority to acquire what may be the last over-the-air resource(s) available on the BTS, further increasing the time for the BTS to transmit the second packet data to the original, higher priority MES. If the subsequent delay in the second packet data transmission becomes significant, link stalling and application failure can occur.

After successful transmission of the second packet data 281, or the otherwise termination of its transmission, the protocol for releasing the over-the-air link between the BTS and the MES is again executed 282. Thus, once again, physical link resources between the BTS and the MES are released 283. Too, if the system requires it at this point, the logical link established for the transmission of the second packet data is also terminated at this time.

In contrast, referring to FIG. 6, with the use of a continuation mechanism, once the first packet data is successfully transmitted 251 from the BTS to the MES, the MES and the BTS do not necessarily have to terminate, and, thereafter re-establish, a logical link or an over-the-air link to transmit 256 a second packet data. Thus, if the BTS has additional packet data ready to transmit to the MES, and the BTS has determined to continue to transmit packet data to that MES at the time, the BTS may continue to transmit packet data to the MES without associated link termination and re-acquisition overhead, and the resultant lower user message throughput.

In the message flow scenario 250, after successfully transmitting 251 the first packet data to the MES, the BTS has more packet data to transmit to the MES and it has determined it can continue to transmit to that MES at the time. Thus, using a continuation mechanism, a continuation protocol is executed 252, and the BTS thereafter continues to transmit packet data to the same MES. As previously described, in a presently preferred embodiment the continuation protocol for a BTS to thereby continue to transmit packet data to an MES includes the BTS transmitting a continuation notification to the MES and the MES responding with a continuation confirmation transmitted to the BTS.

With the continuation mechanism, there is no need for the MES and the BTS to release, and thereafter reestablish, a physical communication link between them. Also with a continuation mechanism, there is no need for the MES and the BTS to terminate, and thereafter reestablish, a logical link for the transmission of packet data between them. Not having to release and reestablish logical and/or physical links reduces the time and overhead required for sending contiguous packet data from a BTS to an MES. Too, it helps ensure optimal network processing by eliminating a manner in which an MES with a lower priority may preempt an MES with a higher priority. Additionally, with the use of the continuation mechanism, because less transmissions are required to establish a physical communication link, and, in some embodiments, a logical link, between a BTS and an MES, for more than one packet data transmission, there is less opportunity for transmission errors.

As can be seen in the exemplary message flow 250 of FIG. 6, the execution of a protocol to acquire over-the-air resources 253 and the execution of a protocol to establish over-the-air resources 254 may only need to each be performed once for multiple packet data transmissions. Too, the execution of a protocol, or protocols, to release, or terminate the use of, such resources 255 may also only need be performed once for multiple packet data transmissions. Further, the execution of the protocols to establish and terminate a logical link for the transmission of packet data may also only need be each executed once for multiple packet data transmissions. Thus, by executing the continuation protocol 252, the overhead in establishing and terminating link resources (physical and logical) between a BTS and an MES is reduced.

Figure 8:
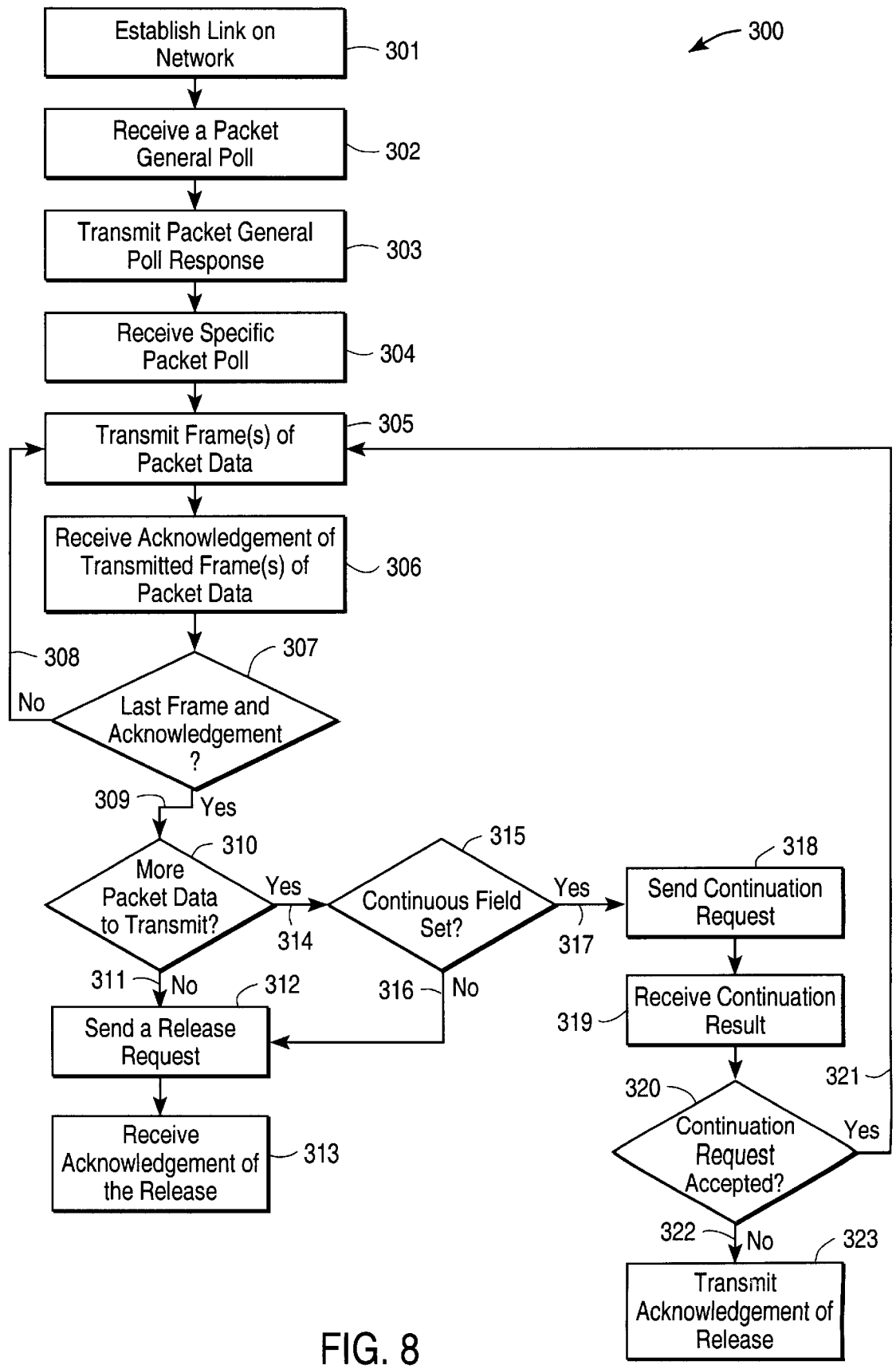
FIG. 8 is a process flow for transmitting more than one contiguous packet data from an MES to a BTS, using a continuation mechanism.

Referring to FIG. 8, a more specific process flow 300 for a presently preferred embodiment of a continuation control where an MES initiates the continuation transmission depicts contiguous packet data transmitted from an MES to a BTS. A logical link is first established 301 on a network, e.g. on a packet data services network, for the transfer of a user message, e.g., packet data, from one end entity, or user, to another, e.g., one MES to another, or one MES to an external network source.

As in process flow 300 packet data is transmitted from an MES to a BTS, the MES first waits to receive 302 a poll message from a BTS, the poll message initiating the protocol for establishing a physical transmission link between the MES and the BTS. Generally, a poll message is a control message that is transmitted from a BTS to indicate the availability of over-the-air resources on the BTS, for establishing a physical communication link on a packet data service provider network. In a presently preferred embodiment, the poll message is a Packet General Poll message.

Upon receiving 302 a poll message, the MES transmits 303 a poll response back to the BTS. Generally, a poll response is a control message that indicates to the BTS that the MES wants to acquire over-the-air resources of the BTS, to establish a physical communication link between them. In a presently preferred embodiment, the poll response is a Packet General Poll Response message. A Packet General Poll Response message indicates to the BTS that the MES wants to acquire over-the-air resources on the BTS for transmitting packet data on the respective packet data services network.

After transmitting 303 the poll response, the MES waits to receive 304 an individual poll from the BTS, directed specifically to the MES. Generally, the individual poll is a control message that has an over-the-air map for both the uplink channel, for transmitting frame(s) of packet data, and the downlink channel, for transmitting acknowledgement(s) of the frame(s) of packet data. In a presently preferred embodiment, the individual poll is a Specific Packet Poll message.

After receiving 304 the individual poll, the MES has an established physical link on a packet data service provider network, via the acquired over-the-air resources of the respective BTS. The MES then transmits 305 one or more frames of packet data to the BTS per time frame, and waits to receive 306 appropriate acknowledgment(s) from the BTS per time frame. Generally, the acknowledgements to the frame(s) of packet data indicate that the data was successfully transmitted. A preferred embodiment for acknowledging frames of packet data is described in co-pending application Lyon & Lyon Docket No. 09/128,739 entitled "Efficient Error Control For Wireless Packet Transmissions," filed Aug. 4, 1998, which, as previously stated, is incorporated herein by reference as if fully set forth herein.

The MES checks 307 whether it has successfully transmitted the last frame of the packet data; i.e., it checks whether it has received an acknowledgement indicative that the packet data has been successfully transmitted. If the MES has not successfully transmitted 308 all frames of the current packet data, it again transmits 305 one or more frames of packet data per time frame to the BTS, and waits to receive 306 the BTS's responsive acknowledgement(s).

If, however, the MES has successfully transmitted 309 all of the frames of the current packet data to the BTS, and has received acknowledgement thereof, it then determines 310 whether it has additional packet data buffered and ready to transmit to the BTS. If the MES does not have additional packet data to transmit at the time 311, it transmits 312 a release request to the BTS. Generally, a release request is a control message that indicates to the BTS that the MES is relinquishing its over-the-air resources, i.e., its physical transmission link, on the BTS. In a presently preferred embodiment, the release request is a Release Request message.

The MES then waits to receive 313 an acknowledgment of its release request from the BTS. The acknowledgement of the release request is a control message that acknowledges that the BTS received the MES's release request, and that the physical transmission link between the MES and BTS will be released. In a presently preferred embodiment, the acknowledgement of the release request is a generic control acknowledgement message.

If the MES has additional packet data buffered and ready to transmit to the BTS 314, it ascertains 315 whether it may request to continue to transmit packet data at the time. In a presently preferred embodiment, a field in the Packet General Poll message previously received and responded to, to acquire a physical link to the BTS, is set to indicate whether or not the MES may thereafter request to continue to transmit packet data to the BTS. In a presently preferred embodiment, a continuation flag field of one bit in every Packet General Poll message indicates whether or not packet data transmission continuation may be requested. In a presently preferred embodiment, the continuation flag field is set to a value of one when continuation requests are allowed, and set to a value of zero otherwise. In an alternative embodiment, the continuation flag field is set to a value of zero when continuation requests are allowed, and set to a value of one otherwise. In a presently preferred embodiment, the BTS generating and transmitting the Packet General Poll message determines the value of the message's continuation flag field based on the results of one or more resource allocation algorithms processed in the BTS.

If the respective Packet General Poll message's continuation flag field indicates that the receiving MES can not request to continue packet data transmissions 316, the MES transmits 312 a release request to the BTS, and then waits to receive 313 an acknowledgement of the release request.

If, however, the respective Packet General Poll message's continuation flag field indicates that the receiving MES can request to continue packet data transmissions 317, then, as at this time the MES has packet data buffered and ready for transmission, it transmits 318 a continuation request to the BTS. In general, the continuation request is a control message from the MES to the BTS requesting the BTS to continue to provide the MES over-the-air resources, for continued packet data transmission. After transmitting the continuation request to the BTS, the MES waits to receive 319 a continuation result from the BTS.

A continuation result generally is a control message that indicates whether or not the MES can continue to transmit packet data to the BTS at the time. In a presently preferred embodiment, the BTS determines whether to accept or deny the continuation request based on the results of one or more resource allocation algorithms executed in the BTS. In a presently preferred embodiment, the continuation result, if it indicates the continuation request is accepted, contains an over-the-air map for both the uplink channel, for transmitting frame(s) of the packet data, and the downlink channel, for transmitting acknowledgement(s) of the frame(s), for the transmission of the additional packet data. In this manner, different over-the-air resources, e.g., different time slots, and/or different amounts of over-the-air resources may be allocated for the new packet data transmission, between the same MES and BTS. Alternatively, the over-the-air map in the continuation result may contain the same uplink channel, e.g., one or more time slots used for the transmission of frames of data, and the same downlink channel, e.g., time slot used for the transmission of acknowledgement(s) of the frames of data, as were used for transmission of the first packet data.

Upon receiving 319 a continuation result from the BTS, the MES processes it to determine 320 whether its continuation request has been accepted or denied. If the continuation result indicates that the continuation request is accepted 321, the MES thereafter transmits the new packet data to the BTS. More specifically, as previously described, the MES transmits 305 one or more frames of packet data to the BTS per time frame, and waits to receive 306 appropriate acknowledgment(s) of the frames of packet data from the BTS.

If, however, the continuation result indicates the continuation request is denied 322, the MES transmits 323 a release acknowledgment to the BTS. Generally, in this situation, the continuation result has the same function as a Release message from the BTS, and the release acknowledgment is a control message that indicates that the MES acknowledges that the physical transmission link between the BTS and itself is to be terminated. The release acknowledgement, therefore, serves to indicate to the BTS that the MES acknowledges it can not continue to transmit packet data to the BTS at the time. In a presently preferred embodiment, the release acknowledgment is a generic control acknowledgement message.

Figure 9:
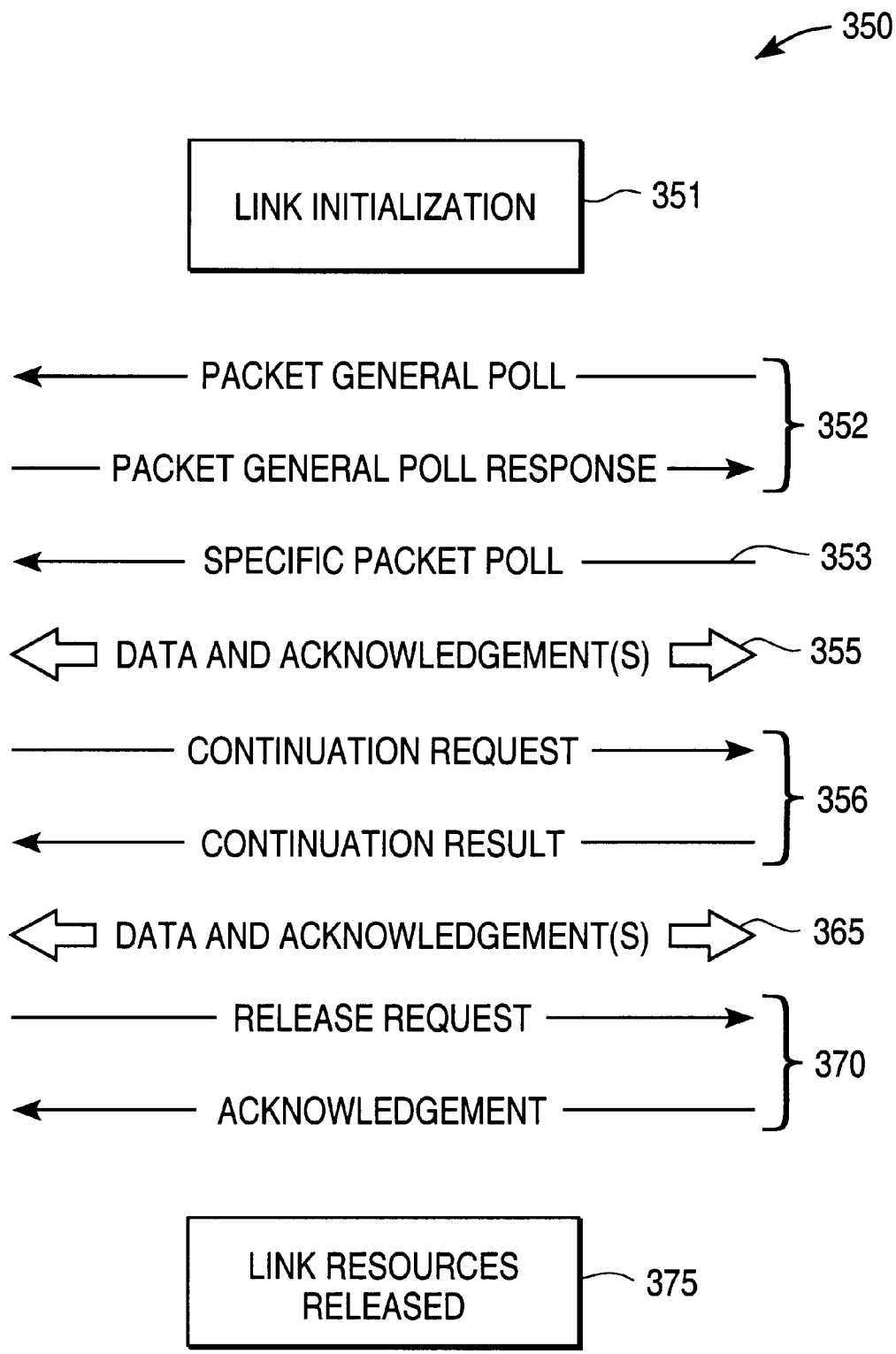
FIG. 9 is a traffic scenario for the transmission of more than one contiguous packet data from an MES to a BTS, using a continuation mechanism.

Referring to FIG. 9, a presently preferred embodiment of a general exemplary message flow 350 for the contiguous transmission of two packets of data from an MES to a BTS shows that with the use of a continuation mechanism, the overhead normally necessary in allocating resources for packet data transmission is reduced. In comparison, referring to FIG. 10, a general exemplary message flow 400 for the transmission of two packets of data from an MES to a BTS with no use of a continuation mechanism highlights the resultant additional required control overhead.

Although FIG. 9 depicts an exemplary message flow 350 for the contiguous transmission of two packets of data from an MES to a BTS, the continuation mechanism allows for additional, i.e., more than two, contiguous transmissions of packets of data from an MES to a BTS.

Figure 10:
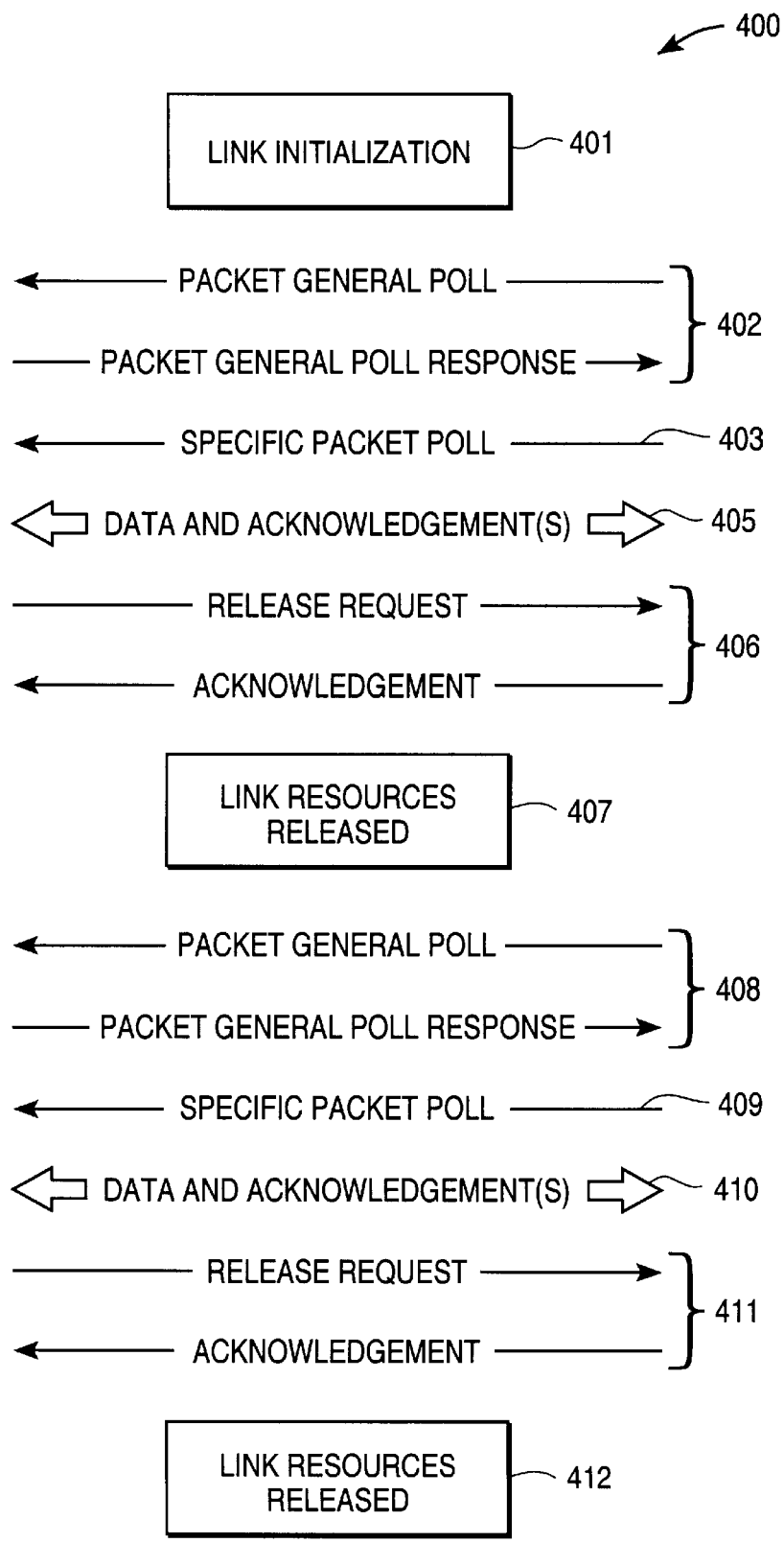
FIG. 10 is a traffic scenario for the transmission of more than one packet data from an MES to a BTS, without the use of a continuation mechanism.

In both the message flow 350 of FIG. 9 and the message flow 400 of FIG. 10 a logical link is established (351 in message flow 350 and 401 in message flow 400 respectively) for the transmission of packet data from one end entity, e.g., an MES, through the packet data services network, to a second end entity, e.g., an MES or an external packet data network.

Before a first packet data can be transmitted, the BTS and MES execute a protocol (352 in message flow 350 and 402 in message flow 400 respectively) to acquire an over-the-air link between them. As previously described, a presently preferred embodiment protocol for an MES to acquire over-the-air resources on a BTS, for subsequent packet data transmission to the BTS, includes the MES receiving a Packet General Poll message from the BTS and transmitting a Packet General Poll Response message in response.

Thereafter, the BTS and MES execute a protocol (353 in message flow 350 and 403 in message flow 400 respectively) for establishing over-the-air resources for packet data transmission between them. As previously described, a presently preferred embodiment protocol for an MES to establish over-the-air resources on a BTS, for packet data transmission to the BTS, includes the MES receiving a Specific Packet Poll message from the BTS.

After receiving a Specific Packet Poll message, the MES can transmit frame(s) of a first packet data (355 in message flow 350 and 405 in message flow 400 respectively) to the BTS, receiving appropriate acknowledgement(s) to the frame(s) transmitted.

In exemplary message flow 400, where no continuation mechanism is used, after the first packet data is successfully transmitted 405, a protocol for releasing the previously established over-the-air link between the MES and the BTS is executed 406. As previously described, in a presently preferred embodiment, the protocol for an MES to initiate releasing the over-the-air link between the MES and the BTS includes the MES transmitting a Release Request message to the BTS, and receiving an acknowledgement thereof from the BTS.

Thus, without a continuation mechanism, physical link resources are released 407 in between packet data transmissions. In some networks, the logical link established for the transmission of the first packet data may also be required to be terminated, or suspended, after the first packet data is transmitted, or its transmission is otherwise terminated.

If the network, or system, requires the termination of the logical link between packet data transmissions with no continuation mechanism, as in the message flow 400, the logical link must be re-established, or a new logical link established, prior to the transmission of a second packet data between the same MES and the same BTS.

Additionally, the protocol to establish a new over-the-air link must be executed 408, and over-the-air resources allocated 409 to the MES, before the MES can transmit 410 a second packet data to the BTS. Reestablishing a logical and/or physical communication link between the MES and the BTS itself involves the use of the BTS's over-the-air resources, as well as taking time. Additionally, forcing the MES to relinquish its communication link with the BTS can allow, in the meantime, another MES with less priority to acquire what may be the last over-the-air resource(s) available on the BTS, further increasing the time for the original, higher priority, MES to transmit the second packet data. If the subsequent delay in the second packet data transmission becomes significant, link stalling and application failure can occur.

After successful transmission of the second packet data 410, or the otherwise termination of its transmission, the protocol for releasing the over-the-air link between the MES and the BTS is again executed 411. Thus, once again, physical link resources between the MES and the BTS are released 412. Too, if the system requires it at this point, the logical link established for the transmission of the second packet data is terminated at this time.

In contrast, referring to FIG. 9, with the use of a continuation mechanism, once the first packet data is successfully transmitted 355 from the MES to the BTS, the MES and the BTS do not necessarily have to terminate, and, thereafter re-establish, a logical link or an over-the-air link to transmit 365 a second packet data. Thus, if the MES has additional packet data ready to transmit to the BTS, and the BTS allows the continuation of packet data transmission from that MES at the time, the MES may continue to transmit packet data to the BTS without associated link termination and re-acquisition overhead, and the resultant lower user message throughput.

In message flow scenario 350, after successfully transmitting 355 the first packet data to the BTS, the MES has more packet data ready to transmit to the BTS and it has determined it can request to continue to transmit to the BTS at the time. Thus, using a continuation mechanism, a continuation protocol is executed 356, and the MES thereafter continues to transmit packet data to the same BTS. As previously described, in a presently preferred embodiment the continuation protocol for an MES to thereby continue to transmit packet data to a BTS includes the MES transmitting a continuation request message to the BTS and thereafter receiving a continuation result from the BTS.

With the continuation mechanism, there is no need for the MES and the BTS to release, and thereafter re-establish, a physical communication link between them. Also with a continuation mechanism, there is no need for the MES and the BTS to terminate, and thereafter re-establish, a logical link for the transmission of packet data. Not having to release and re-establish logical and/or physical links reduces the time and overhead required for sending contiguous packet data from an MES to a BTS. Too, it helps ensure optimal network processing by eliminating a manner in which an MES with a lower priority may preempt an MES with a higher priority. Additionally, with the use of the continuation mechanism, because less transmissions are required to establish a physical communication link, and, in some embodiments, a logical link, between a BTS and an MES, for more than one packet data transmission, there is less opportunity for transmission errors.

As can be seen in the exemplary message flow 350 of FIG. 9, the execution of a protocol to acquire over-the-air resources 352 and the execution of a protocol to establish over-the-air resources 353 may only need to each be performed once for multiple packet data transmissions. Too, the execution of a protocol to release, or terminate the use of, such resources 370 may also only need be performed once for multiple packet data transmissions. Further, the execution of the protocols to establish and terminate a logical link for the transmission of packet data may also only need be each executed once for multiple packet data transmissions. Thus, by executing the continuation protocol 356, the overhead in establishing and terminating link resources (physical and logical) between a BTS and an MES is reduced.

Figure 11:
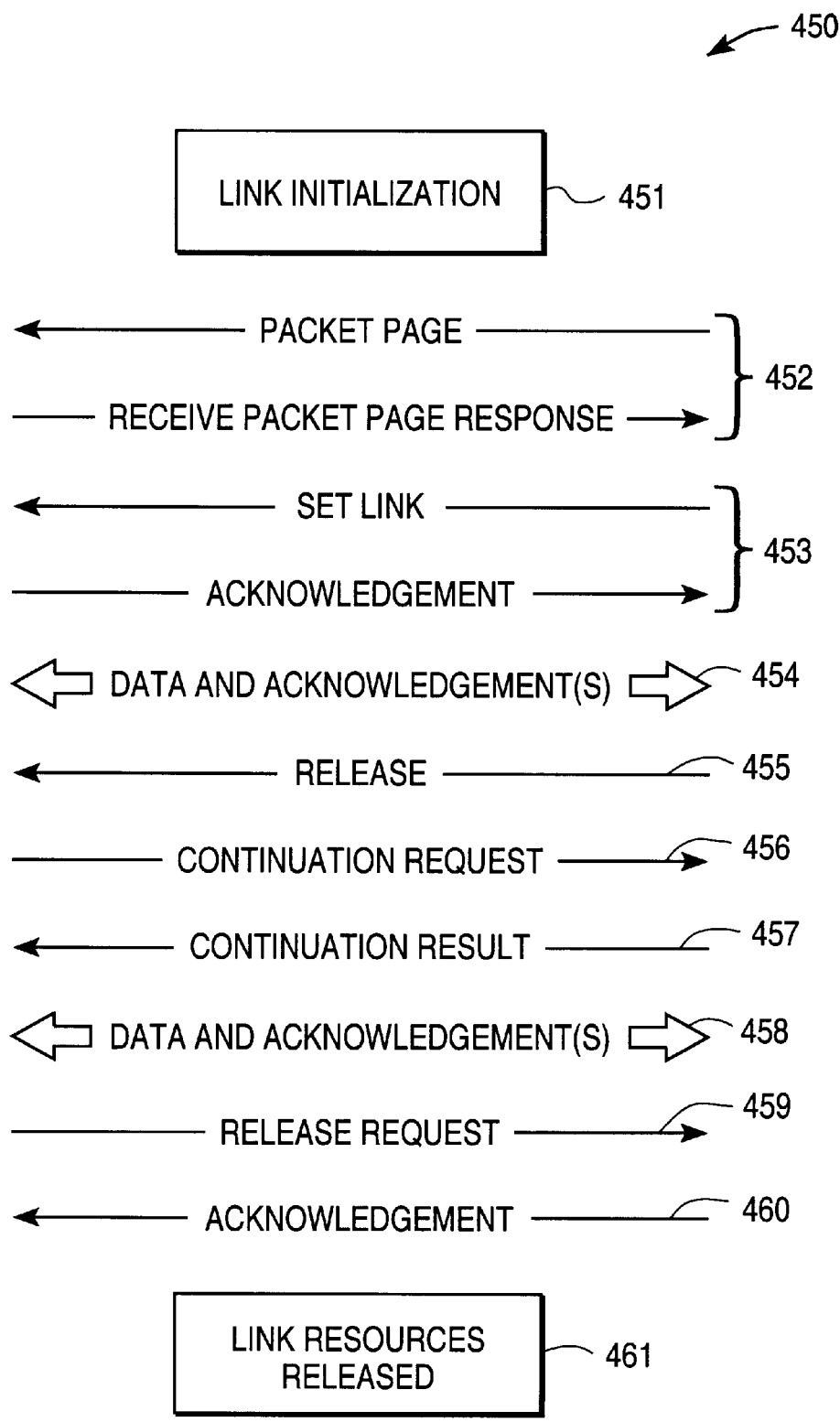
FIG. 11 is a traffic scenario for the transmission of one packet data from a BTS to an MES and the contiguous transmission of a second packet data from the MES to the BTS, using a continuation mechanism.

Referring to FIG. 11, a presently preferred embodiment of an exemplary general message flow 450 for the transmission of packet data from a BTS to an MES and the subsequent contiguous transmission of packet data from the MES to the BTS shows that with the use of a continuation mechanism, the overhead required in allocating and releasing resources is reduced.

Although FIG. 11 depicts an exemplary message flow 450 for the contiguous transmission of two packets of data between an MES and a BTS, the continuation mechanism allows for additional, i.e., more than two, contiguous transmissions of packet data between an MES and a BTS. Further, the continuation protocol can be used whether an MES continues to transmit packet data to a BTS, a BTS continues to transmit packet data to an MES, or a BTS and an MES switch roles one or more times as the respective receiving and transmitting entities.

In message flow 450, a logical link is initialized 451 for the transmission of packet data from one end entity, e.g., an MES or an external packet data network, through a packet data services network, to a second end entity, e.g., an MES or an external packet data network.

Before a first packet data can be transmitted, the BTS and MES execute a protocol 452 to acquire an over-the-air link between them. As previously described, a presently preferred embodiment protocol for an MES to acquire an over-the-air link with a BTS, for a subsequent packet data transmission from the BTS to the MES, includes the BTS transmitting a Packet Page message to the MES and the MES responding with a Receive Packet Page Response message transmitted to the BTS.

Thereafter, the BTS and MES execute a protocol 453 for establishing over-the-air resources for packet data transmission between them. As previously described, a presently preferred embodiment protocol for a BTS to establish over-the-air resources for an MES, for the BTS to thereafter transmit packet data to the MES, includes the BTS transmitting a Set Link message to the MES and the MES responding with an acknowledgement message transmitted to the BTS.

In message flow 450, after receiving an acknowledgement of the Set Link message, the BTS transmits a first packet data 454 to the MES, receiving appropriate acknowledgement(s) to the frame(s) of packet data transmitted.

In message flow 450, after successfully transmitting the first packet data 454 to the MES, the BTS has no more packet data to transmit to the MES. Thus, the BTS transmits 455 a Release message to the MES, indicating that the MES is to release its acquired over-the-air resources on the BTS. The MES, however, has packet data buffered and ready for transmission to the BTS when it receives the Release message from the BTS. Thus, the MES transmits 456 a continuation request to the BTS, requesting to transmit packet data to the BTS.

In a presently preferred embodiment, a field in the Packet Page message that the MES previously received and responded to, to acquire a physical link to the BTS, is set to indicate whether or not the MES may thereafter request to transmit packet data to the BTS, without having to first release and re-acquire a physical link, and, in some embodiments, a logical link, on the packet data services network. In a presently preferred embodiment, a continuation flag field of one bit in every Packet Page message indicates whether or not the receiving MES may subsequently request to continue packet data transmissions between itself and the BTS. In a presently preferred embodiment, the continuation flag field is set to a value of one when continuation requests are allowed, and set to a value of zero otherwise. In an alternative embodiment, the continuation flag field is set to a value of zero when continuation requests are allowed, and set to a value of one otherwise. In a presently preferred embodiment, the BTS generating and transmitting the Packet Page message determines the value of the message's continuation flag field based on the results of one or more resource allocation algorithms processed in the BTS.

In message flow 450, the continuation flag field of the Packet Page message is set to indicate that the receiving MES may subsequently request to continue packet data transmissions between itself and the BTS.

In message flow 450, once the MES transmits 456 a continuation request to the BTS, it then waits for a continuation result from the BTS. The continuation result, as previously described, generally indicates whether or not the MES can transmit packet data to the BTS at the time. In a presently preferred embodiment, the BTS determines whether to accept or deny the continuation request based on the results of one or more resource allocation algorithms executed in the BTS. In a presently preferred embodiment, the continuation result, if it indicates the continuation request is accepted, contains an over-the-air map for both the uplink channel, for transmitting frame(s) of packet data, and the downlink channel, for transmitting acknowledgement(s) of the frame(s), for the transmission of the additional packet data.

Upon receiving 457 a continuation result from the BTS indicating that the MES can transmit packet data to the BTS, the MES transmits 458 the frame(s) of the second packet data to the BTS, receiving acknowledgment(s) thereto from the BTS.

If the continuation result from the BTS had indicated that the MES's continuation request was denied, the MES would have transmitted an acknowledgement to the BTS. The over-the-air link resources between the BTS and the MES would thereafter have been released.

In message flow 450, following the second packet data transmission 458 from the MES to the BTS, the MES does not have any more packet data to transmit to the BTS at the time. Thus, the MES transmits 459 a Release Request message to the BTS. In message flow 450, the BTS also does not have any more packet data to transmit to the MES at the time, and, therefore, the BTS responds to the Release Request message by transmitting 460 an acknowledgement message to the MES. The over-the-air link resources between the BTS and the MES are thereafter released 461.

Although in exemplary flow 450, both the MES and the BTS has no packet data ready to transmit to the other following the transmission of the second packet data from the MES to the BTS, in general, either the MES or the BTS may have additional packet data ready to transmit and execute the appropriate continuation protocol accordingly.

Figure 12:
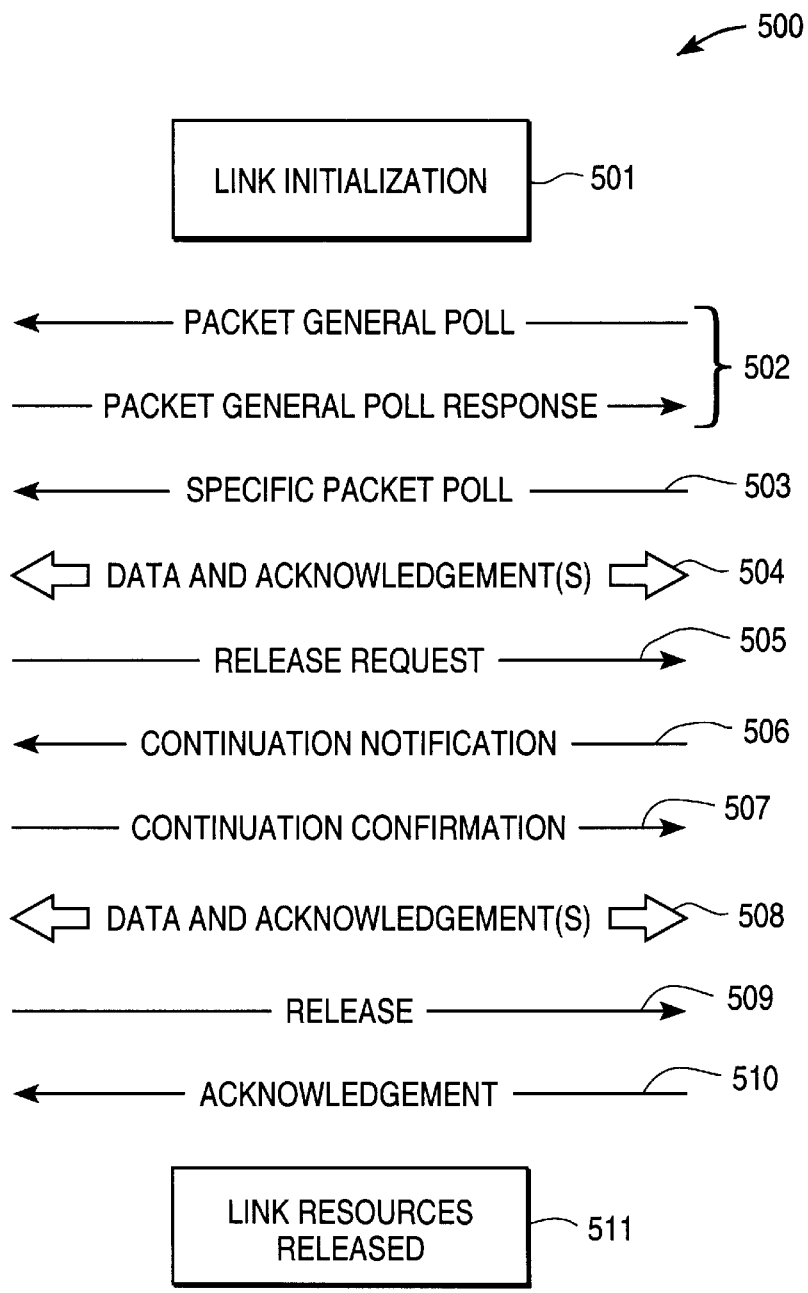
FIG. 12 is a traffic scenario for the transmission of one packet data from an MES to a BTS and the contiguous transmission of a second packet data from the BTS to the MES, using a continuation mechanism.

Referring to FIG. 12, a presently preferred embodiment of an exemplary general message flow 500 for the transmission of packet data from an MES to a BTS and the subsequent contiguous transmission of packet data from the BTS to the MES shows that with the use of a continuation mechanism, the overhead required in allocating and releasing resources is reduced. In message flow 500, a logical link is initialized 501 for the transmission of packet data from one end entity, e.g., an MES or an external packet data network, through a packet data services network, to a second end entity, e.g., an MES or an external packet data network.

Before a first packet data can be transmitted, the BTS and MES execute a protocol 502 to acquire an over-the-air link between them. As previously described, a presently preferred embodiment protocol for an MES to acquire an over-the-air link with a BTS, for a subsequent packet data transmission to the BTS, includes the BTS transmitting a Packet General Poll message that is received by the MES and the MES responding with a Packet General Poll Response message transmitted to the BTS.

Thereafter, the BTS and MES execute a protocol 503 for establishing over-the-air resources for packet data transmission between them. As previously described, a presently preferred embodiment protocol for a BTS to establish over-the-air resources for an MES, for the MES to thereafter transmit packet data to the BTS, includes the BTS transmitting a Specific Packet Poll message to the MES.

In message flow 500, after receiving a Specific Packet Poll message, the MES transmits 504 a first packet data to the BTS, receiving appropriate acknowledgement(s) to the frame(s) of packet data transmitted.

In message flow 500, after successfully transmitting 504 the first packet data to the BTS, the MES has no more packet data to transmit to the BTS. Thus, the MES transmits 505 a Release Request message to the BTS, indicating that the MES is ready to release its acquired over-the-air resources on the BTS. The BTS, however, has packet data buffered and ready for transmission to the MES when it receives the Release Request message from the MES. Thus, the BTS transmits 506 a continuation notification to the MES, indicating that the BTS wants to transmit packet data to the MES.

In a presently preferred embodiment, the continuation notification contains an over-the-air map for both the downlink channel, for transmitting frame(s) of packet data, and the uplink channel, for transmitting acknowledgement(s) of the frame(s), for the transmission of the additional packet data.

In message flow 500, incorporating a continuation mechanism, once the MES receives the continuation notification transmitted 506 from the BTS, it responds by transmitting 507 a continuation confirmation to the BTS. As previously described, the continuation confirmation transmitted 507 from the MES to the BTS generally indicates that the MES received the continuation notification from the BTS.

Upon receiving a continuation confirmation transmitted 507 from the MES, the BTS transmits 508 the frames(s) of the second packet data to the MES, receiving acknowledgement(s) thereto from the MES.

In message flow 500, following the second packet data transmission 508 from the BTS to the MES, the BTS does not have any more packet data to transmit to the MES at the time. Thus, the BTS transmits 509 a Release message to the MES. In message flow 500, the MES also does not have any more packet data to transmit to the BTS at the time, and, therefore, the MES responds to the Release message by transmitting 510 an acknowledgement message to the BTS. The over-the-air link resources between the BTS and the MES are thereafter released 511.

Although in exemplary flow 500, both the MES and the BTS have no packet data ready to transmit to the other following the transmission of the second packet data from the BTS to the MES, in general, either the MES or the BTS may have additional packet data ready to transmit and execute the appropriate continuation protocol accordingly.

Figure 13:
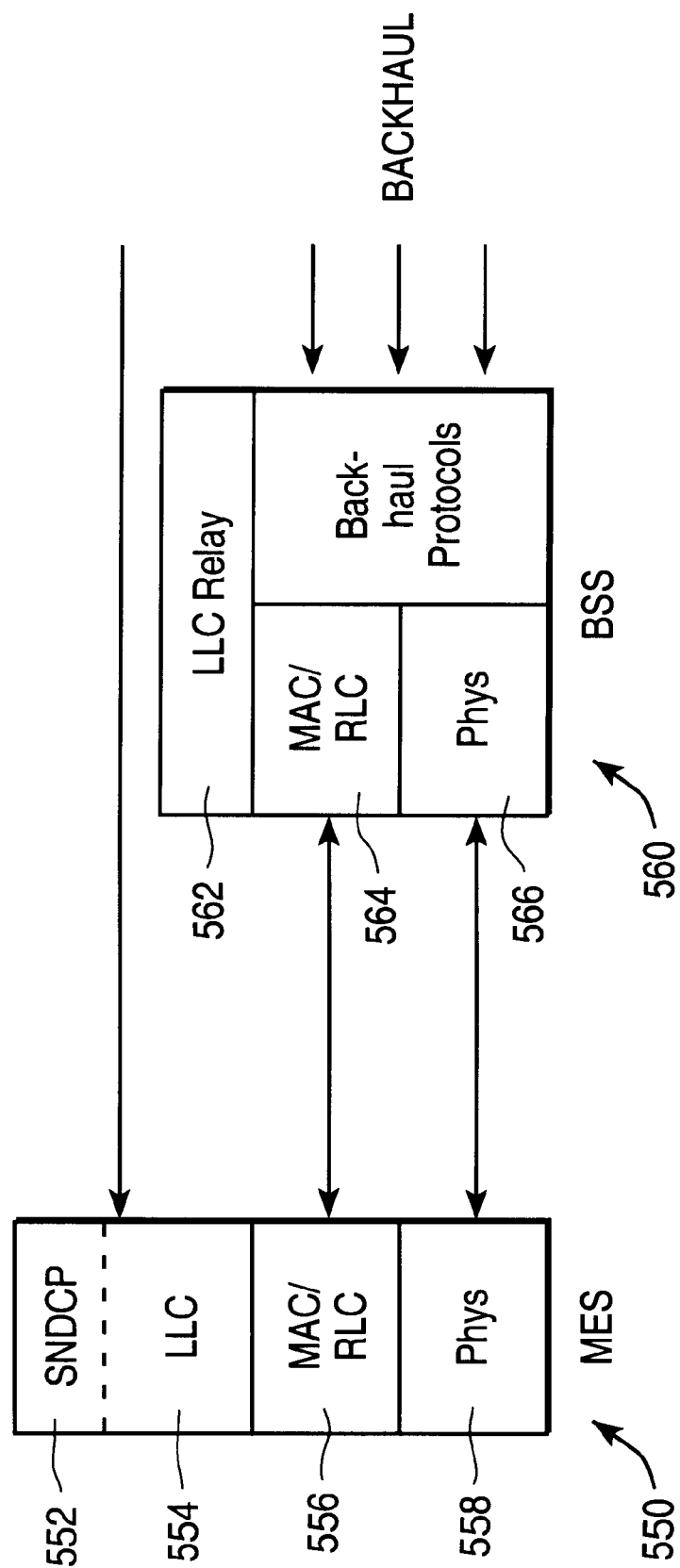
FIG. 13 illustrates an embodiment of a protocol stack for a mobile end station and an embodiment of a protocol stack for a base station subsystem.

Referring to FIG. 13, a presently preferred embodiment of a protocol stack for an MES and a presently preferred embodiment of a protocol stack for a base station subsystem ("BSS"), the protocol stacks generally describing protocol processing layers, is defined for the conveyance of information between a BTS and an MES. In the MES protocol stack 550, the sub-network dependent convergence protocol ("SNDCP") layer 552 can be viewed as a layer of the logical link control ("LLC") protocol layer 554. The SNDCP layer 552 provides mapping of Layer 3 Internet Protocol ("IP") packets onto LLC frames for transmission within a packet data services network. The SNDCP layer 552 provides data encryption, IP header compression and, in an embodiment, overall data compression.

The LLC protocol layer 554 of the MES protocol stack 550 provides a bi-directional, reliable logical link between the MES and a packet data service provider network. The LLC protocol layer 554 incorporates framing, addressing and flow control.

The media access control ("MAC")/radio link control ("RLC") protocol layer 556 of the MES protocol stack 550 provides access to and a link on the over-the-air interface between the MES and a BTS. More specifically, the RLC protocol provides a reliable link on the over-the-air interface. The MAC protocol, for its part, is responsible for access control of the MES to the over-the-air interface of a BTS. The MAC protocol comprises the radio resource control algorithms and procedures for executing the continuation mechanisms, including the continuation protocols, previously described.

The physical protocol layer 558 of the MES protocol stack 550 provides the physical interface control for transmission between the MES and a BTS. In a presently preferred embodiment, the physical protocol layer 558 uses the IS-661 radio technology.

As with the physical protocol layer 558 in the MES protocol stack 550, the physical protocol layer 566 in the BSS protocol stack 560 provides the physical interface control for transmission between the respective BTS and an MES. In a presently preferred embodiment, the physical protocol layer 566 uses the IS-661 radio technology.

The media access control ("MAC")/radio link control ("RLC") protocol layer 564 of the BSS protocol stack 560 provides access to and a link on the over-the-air interface between the respective BTS and an MES. More specifically, the RLC protocol provides a reliable link on the over-the-air interface. The MAC protocol, for its part, is responsible for the control of access of MESs to the respective BTS's over-the-air interface. The MAC protocol comprises the radio resource control algorithms and procedures for executing the continuation mechanisms, including the continuation protocols, previously described.

The LLC relay protocol layer 562 of the BSS protocol stack 560 generally provides the relay of logical link frames within a packet data service provider network.

In a presently preferred embodiment, both the MESs and the BTSs have a processor and associated memory for executing respective software instructions to accomplish the above-described continuation mechanisms.

While embodiments are disclosed herein, many variations are possible which remain within the spirit and scope of the invention. Such variations are clear upon inspection of the specification, drawings and claims herein. The invention therefore is not to be restricted except by the scope of the appended claims.

What is claimed is as follows:

1. A method for transmission continuation control, comprising:
   establishing a physical transmission link between a first entity and a second entity;
   transmitting a first user message from one of said first and second entities to the other of said first and second entities;
   executing a continuation protocol between said first entity and said second entity while maintaining said physical transmission link;
   transmitting a second user message from one of said first and second entities to the other of said first and second entities; and
   terminating said physical transmission link between said first entity and said second entity after the transmission of said second user message.

2. The method for transmission continuation control of claim 1, wherein said first user message and said second user message comprise packet data.

3. The method for transmission continuation control of claim 1, wherein said execution of said continuation protocol comprises transmitting a control message between said first entity and said second entity, said control message comprising an uplink channel and a downlink channel for use in the transmission of said second message.

4. The method for transmission continuation control of claim 1, wherein said first entity is a base transceiver station and said second entity is a mobile end station and said physical transmission link comprises an uplink channel and a downlink channel between said base transceiver station and said mobile end station.

5. The method for transmission continuation control of claim 4, wherein said physical transmission link for said second user message transmission is comprised of a downlink channel that is different from said downlink channel of the physical transmission link for said first user message transmission.

6. The method for transmission continuation control of claim 4, wherein said second user message is transmitted from said first entity to said second entity, said method further comprising the step of making a determination to transmit said second user message from said first entity to said second entity, wherein said determination is based on the result of resource allocation algorithms processed by said first entity.

7. The method for transmission continuation control of claim 1, wherein said first entity is a base transceiver station and said second entity is a mobile end station.

8. The method for transmission continuation control of claim 7, wherein said first user message is transmitted from said base transceiver station to said mobile end station and said second user message is transmitted from said mobile end station to said base transceiver station.

9. The method for transmission continuation control of claim 7, wherein said first user message is transmitted from said mobile end station to said base transceiver station and said second user message is transmitted from said base transceiver station to said mobile end station.

10. The method for transmission continuation control of claim 1, wherein said first user message and said second user message are transmitted from said first entity to said second entity.

11. A method for transmission continuation control comprising:
    establishing a physical transmission link between a first entity and a second entity;
    transmitting a first user message from said first entity to said second entity;
    executing a continuation protocol between said first entity and said second entity while maintaining said physical transmission link;
    transmitting a second user message from said first entity to said second entity; and
    terminating said physical transmission link between said first entity and said second entity subsequent to the transmission of said second user message from said first entity to said second entity.

12. The method for transmission continuation control of claim 11, wherein said first entity is a mobile end station and said second entity is a base transceiver station and said physical transmission link comprises an uplink channel and a downlink channel between said mobile end station and said base transceiver station.

13. The method for transmission continuation control of claim 12, wherein said execution of a continuation protocol comprises:
    transmitting a continuation request from said first entity to said second entity; and
    transmitting a continuation result from said second entity to said first entity.

14. The method for transmission continuation control of claim 13, wherein said uplink channel comprises a first uplink channel and said downlink channel comprises a first downlink channel, and wherein said continuation result comprises a second uplink channel and a second downlink channel for the transmission of said second user message and said second uplink channel and said second downlink channel thereafter comprise the physical transmission link between said first entity and said second entity.

15. The method for transmission continuation control of claim 13, wherein said establishment of said physical transmission link between said first entity and said second entity comprises the transmission of a poll message from said second entity to said first entity, and wherein said poll message comprises a bit, said bit indicative of whether said first entity may transmit said continuation request to said second entity.

16. The method for transmission continuation control of claim 11, wherein said first entity is a base transceiver station and said second entity is a mobile end station;
    said physical transmission link comprises an uplink channel and a downlink channel between said base transceiver station and said mobile end station; and
    said execution of a continuation protocol comprises transmitting a continuation notification from said first entity to said second entity, and transmitting a continuation confirmation from said second entity to said first entity.

17. A transmission continuation control protocol for allowing continued data transmission between a first entity and a second entity communicating over a physical transmission link, comprising:
    a poll message operable to initiate said transmission continuation control protocol between said first and second entities;

a continuation request operable to request continued data transmission between said first and second entities; and a continuation result operable to indicate whether said physical transmission link will be maintained to allow for continued data transmission between said first and second entities.

18. The transmission continuation control protocol of claim 17, wherein said poll message comprises a continuation flag field, and said continuation flag field comprises a value indicative of whether said continuation request is transmitted.

19. The transmission continuation control protocol of claim 17, wherein said continuation result comprises an uplink channel and a downlink channel.

* * * * *

Disclaimer 6,243,365—Carl Mansfield, Portland, OR; Izzet M. Bilgic, Colorado Springs, CO; Benjamin K. Gibbs, Colorado Springs, CO; Sherman L. Gavette, Colorado Springs, CO. CONTINUATION CONTROL FOR WIRELESS PACKET DATA. Patent dated June 5, 2001. Disclaimer filed May 9, 2002, by assignee Opuswave Networks, Inc.

Hereby disclaims to the Public the entire term of said patent.
*(Official Gazette, July 16, 2002)*